June 8, 1954    K. G. STERN    2,680,816
FILM BADGE RADIATION DETECTOR
Filed March 12, 1951    2 Sheets-Sheet 1
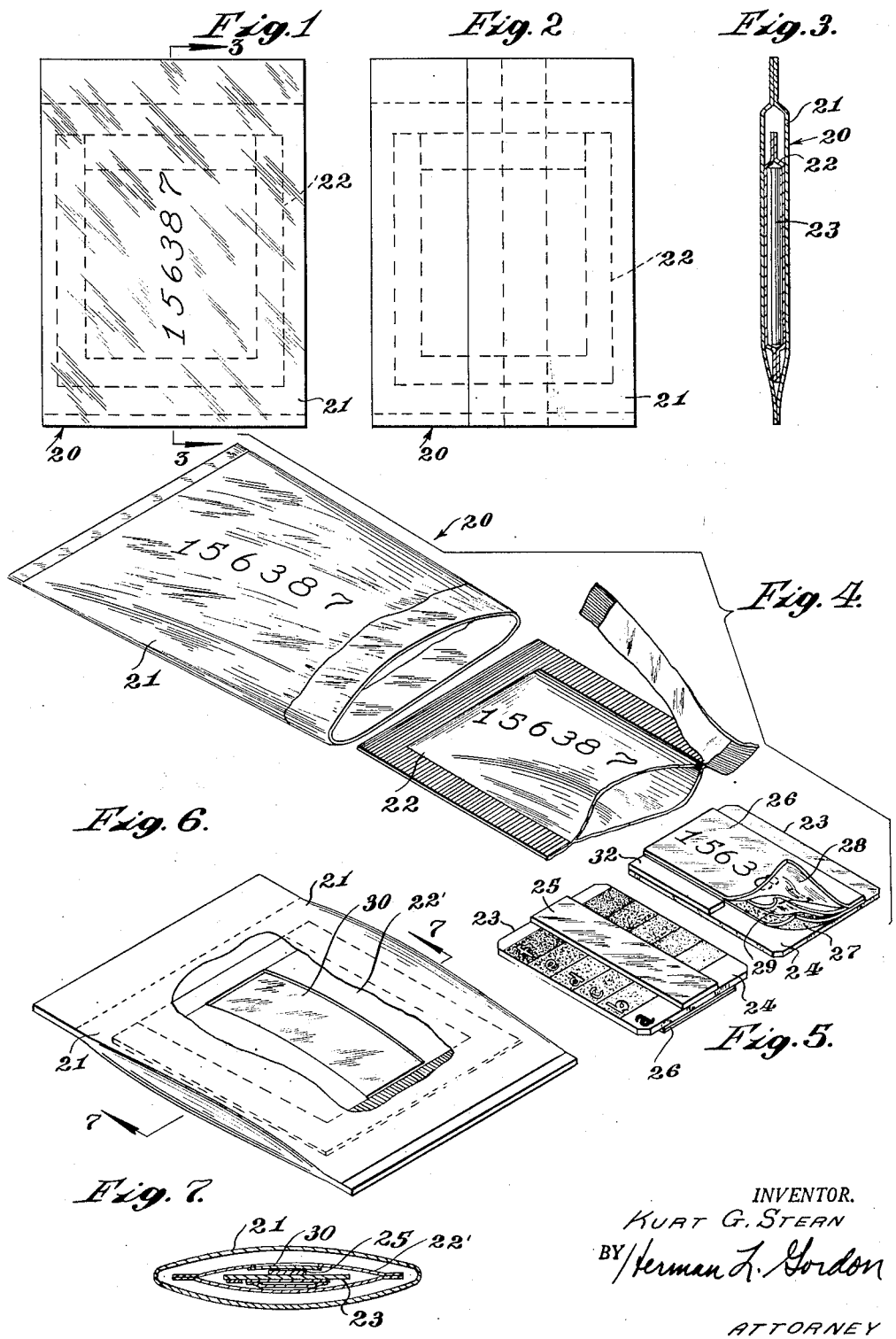
INVENTOR.
KURT G. STERN
BY Herman L. Gordon
ATTORNEY

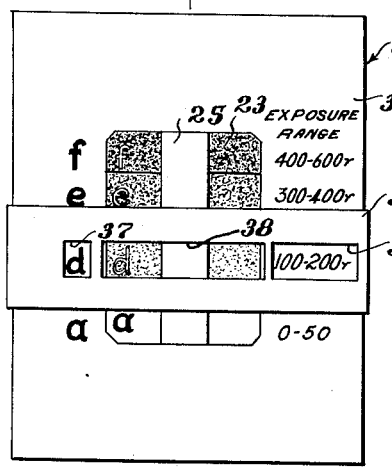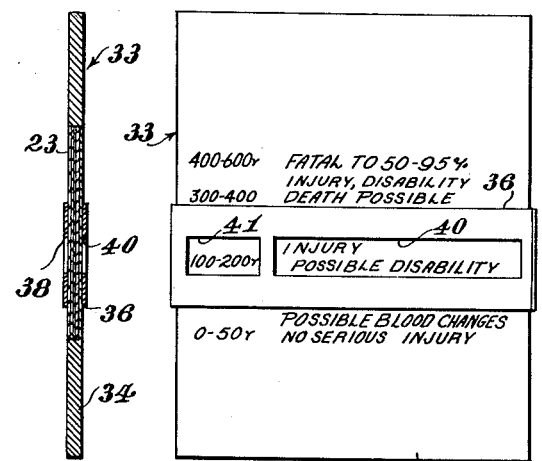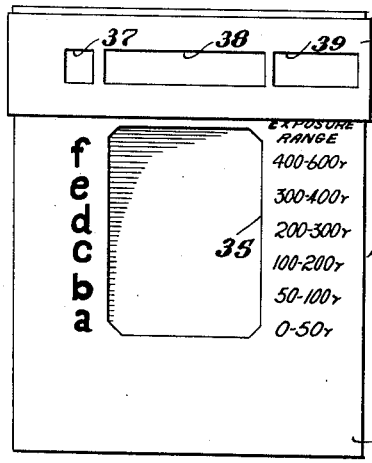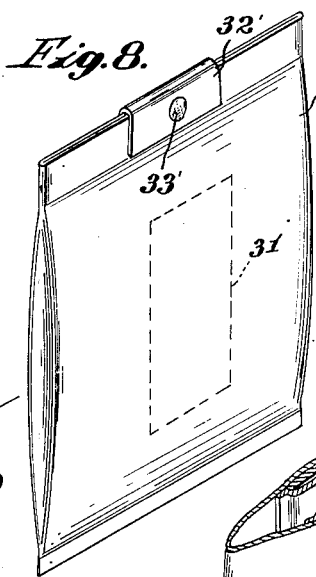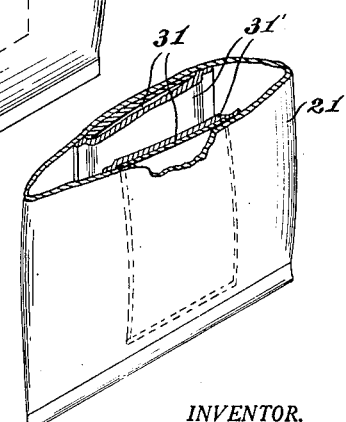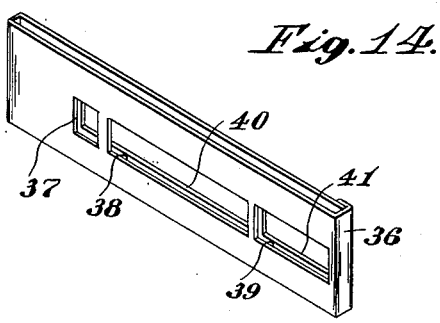

Patented June 8, 1954

2,680,816

UNITED STATES PATENT OFFICE 2,680,816

FILM BADGE RADIATION DETECTOR

Kurt G. Stern, New York, N. Y.

Application March 12, 1951, Serial No. 215,053

7 Claims. (Cl. 250—83)

This invention relates to radiation-detecting devices, and more particularly to radiation-detecting devices of the film badge type adapted to be carried by persons, or to be carried by objects, to detect exposure to ionizing radiations, such as gamma rays, beta rays, X-rays, and the like.

A main object of the invention is to provide a novel and improved radiation-detecting device which is simple in construction, which is compact in size, and which is inexpensive to manufacture.

A further object of the invention is to provide an improved radiation-detecting device arranged to provide positive identification of the individual who has previously worn the device after said device has been processed and the degree of exposure to radiation has been determined.

A still further object of the invention is to provide an improved radiation-detecting device especially suited for mass distribution to large portions of the population for evaluating and controlling the effects of radiation attack on target areas in atomic warfare.

A still further object of the invention is to provide an improved radiation detector of the film badge type which may be processed by conventional mass-production developing techniques and which provides accurate indications of the degree of exposure to ionizing radiation to which an individual carrying the badge has been previously subjected.

A still further object of the invention is to provide an improved radiation-detecting film badge especially suitable for organized civilian defense against atomic attack of densely populated communities, said badge having positive means of identification of the wearer thereof and being arranged to provide accurate indications of exposure to ionizing radiations over substantially the entire range to be expected within the area affected by an atomic explosion.

A still further object of the invention is to provide an improved radiation-detector of the film badge type and improved means for determining and interpreting the indications thereof, whereby the effects of an atomic attack on a population group may be readily evaluated by civilian defense authorities.

Further objects and advantages of the invention will become apparent from the following description and claims, and from the accompanying drawings, wherein:

Figure 1 is a front elevational view of an improved radiation-detecting film badge constructed in accordance with the present invention.

Figure 2 is a rear elevational view of the film badge device of Figure 1.

Figure 3 is a vertical cross-sectional view taken on line 3—3 of Figure 1.

Figure 4 is a perspective view of the components of the device of Figures 1 to 3, shown in disassembled positions.

Figure 5 is a perspective view of the exposure-indicating element of the radiation-detecting device of Figures 1 to 4.

Figure 6 is a perspective view, partly broken away, of a modified form of the radiation-detecting device of the present invention, illustrating the manner of adapting the device for the detection of radiation of less penetrating effect than gamma radiation, such as alpha rays.

Figure 7 is a cross-sectional view taken on line 7—7 of Figure 6.

Figure 8 is a perspective view of a still further modified form of the present invention, illustrating the manner of shielding the device against soft beta and gamma rays.

Figure 9 is a perspective cross-sectional view taken on line 9—9 of Figure 8.

Figure 10 is a front elevational view of a reading gauge adapted to provide easy and rapid evaluation of the degree of exposure of the indicating element of a radiation-detecting device according to the present invention.

Figure 11 is a vertical cross-sectional view taken on line 11—11 of Figure 10.

Figure 12 is a rear elevational view of the reading gauge of Figure 10, showing the means for interpreting the indications of the radiation-detecting element.

Figure 13 is a front elevational view of the reading gauge of Figure 10 with the radiation-indicating element omitted.

Figure 14 is an enlarged perspective view of the apertured slidable mask element of the reading gauge device of Figures 10 to 13.

Reference is made to applicant's copending application, Serial No. 182,830, filed Sept. 1, 1950, containing related subject matter.

A main purpose of the present invention is to provide a simple and inexpensive dosimeter for determining promptly the extent to which an individual has been exposed to gamma or other ionizing radiation resulting from an attack by atomic weapons, particular consideration being given to the adaptation of the device for mass production and for distribution to the population in target areas.

There appear to be two distinct aspects to the problem of detection and measurement of ionizing radiation produced by atomic weapons: (1) Exposure of personnel to the initial or prompt gamma radiation emitted within the first minute following explosive atomic fission, and (2) more or less persistent radiation effects due to ground, water and air contamination by fission products and residual bomb fragments and dust. The first aspect represents essentially a problem of integrating dosimetry, while the second aspect poses primarily a monitoring problem. The device herein described is specifically designed as a dosimeter, and not as a monitoring instrument. Therefore, it can fulfill its primary purpose only if it is actually worn by all persons in the target area at the time of the attack.

It is generally recognized that among the various instruments available for this purpose, namely, pocket ion chamber dosimeters, electroscopes, chemical indicators of the crystal and colorimetric type and film badges, the latter provide the most reliable and permanent indication of radiation exposure. This is borne out by the current use of film badges by all personnel likely to be exposed to penetrating radiation, e. g., in atomic installations and in radio isotope laboratories. The chief drawback of the conventional film badge design is the laborious and time consuming procedure of processing and evaluation at a frequently distant location, and the need for specially trained personnel in performing these operations, which involve the preparation of individual calibration curves with the aid of a suitable radiation source and photoelectric densitometry. The present device, while retaining all of the intrinsic advantages of the photographic method, eliminates to a large extent those drawbacks which up until now have prevented the general distribution of this diagnostic aid to the population in prime target areas.

Another essential requirement for a film badge suitable for civilian defense purposes is that its sensitivity must correspond to the gamma ray exposure range which may be expected by personnel within a one mile radius from the point of explosion in the event of an air burst of a nominal atom bomb, viz., up to 600 or more roentgens, depending upon distance and shielding. The conventional film badges are ordinarily designed to cover much narrower and lower exposure ranges, e. g., from zero to two, and one to ten roentgens, in accordance with their current use as radiation protection devices to indicate cumulative exposure to small doses of ionizing radiation.

In principle, the badge of the present invention comprises a small tab carrying a comparison scale and a strip of photographic material on one side and a piece of pressure-sensitive tape on the opposite side. This tab is sealed hermetically into a metal foil laminate envelope which, in turn, is inserted into a protective sheath of plastic or similar material adapted mainly to protect the inner envelope from mechanical damage.

Following suspected exposure to penetrating radiation, the indicator tab is removed and developed, and the range of exposure is estimated by visual comparison of the shade of the developed photographic material with the various steps of the adjacent comparison scale.

Obviously, the comparison scale and the photographic element are components of considerable importance in the device, since they serve to register the amount of penetrating radiation received by the wearer of the badge. It may be assumed that in the case of a nuclear explosion the predominant ionizing radiation which may be expected at a distance from 1,000 to approximately 5,000 feet outward from the ground zero will be gamma rays with an average energy of 3 mev. Although an atomic explosion is accompanied by a shower of fast and slow neutrons in addition to the prompt gamma radiation, it is estimated that the lethal range of the neutrons from a nominal atomic bomb would be limited to a distance of about 1,800 feet from the point of explosion, that is, to a perimeter within which total or far reaching destruction of the target area may be expected from other causes. Thus, it may be concluded that neutrons from an atomic bomb would not normally represent a major hazard.

In the device of the present invention, the gamma ray exposure is registered preferably on a strip of photographic paper of suitable sensitivity characteristics. Paper instead of film is preferred because the badge is evaluated by reflected light.

The tab has the strip of photographic paper on one side and has affixed to its other side a pressure-sensitive element which serves as the identification means of the device. The pressure-sensitive element is of a type which will retain in a permanent manner information recorded thereon by pressure, e. g., numbers imprinted by conventional metal stamps, by a stylus, or by a typewriter. The important feature of this identification element is that identifying marks may be recorded on it even after the badge is sealed. This eliminates the need for the use of X-rays or the like for the numbering of film badges enclosed in sealed, light-tight envelopes, as hitherto employed. It also makes it possible to record the same number simultaneously on the outer surface of the package as well as on the inner film tab. The area available for recording allows for the addition of further information, e. g., blood type and group, at a later date. Positive identification is assured through retention of the outer envelope bearing the number by the wearer or by medical personnel while the inner foil envelope is transmitted to the processing laboratory.

Another important function of the pressure-sensitive element employed herein is that it may serve as a heat-damage indicator. The type of element employed is such that when heated for any length of time to temperatures exceeding 150 degrees Fahrenheit (65 degrees centigrade), the element will assume the color of its inner pigment layer, which is visible along the border of the undamaged element. In this manner it is readily possible to detect heat damage to the film badge, which may have occurred during storage or by improper handling. Inasmuch as a photographic emulsion is employed which will withstand a temperature of at least 350 degrees F. (175 degrees C.) for ten seconds without marked impairment of its photographic properties, there exists a considerable margin of safety between the "turning point" of the identification "indicator" and the point of serious damage to the dosimeter component of the device.

Referring now to the drawings, and more particularly to Figures 1 to 5, the reference numeral 20 generally designates one form of improved film badge constructed in accordance with the present invention. The film badge 20 comprises an outer translucent protective sheath 21 of suitable light flexible material, having high mechanical and chemical resistance, such as leather or polyethylene plastic, in which is hermetically sealed the foil laminate envelope 22. The foil laminate material of the envelope 22 may consist of a layer of aluminum foil sandwiched between two thin layers of transparent plastic films. This construction not only increases the mechanical resistance of the foil to wear and tear and to cracking, but also prevents direct contact between the photographic emulsion and the metal foil surface, which might produce pseudo-photographic effects. The foil laminate envelope 22 is heat-sealed under pressure around its margins so as to insure complete protection of its contents against light and humidity. This method of packaging renders the film badge practically tamper-proof, since the envelope cannot be readily closed or restored to its original appearance once it has been torn or opened.

An additional advantage of the metal foil component is its high degree of reflectivity, which may be expected to protect the contents of the envelope against the effects of thermal radiation, e. g., of the type accompanying atomic blasts (thermal flash). Owing to the choice of a low-atomic weight metal (aluminum) as an enclosing envelope, hard beta rays may also be expected to penetrate the envelope.

Designated generally at 23 is the indicator element, which comprises a generally rectangular cardboard tab 24, on one side of which is longitudinally and centrally secured the strip of photographic paper 25. Strip 25 may comprise Kodabromide No. 4 paper, as manufactured by the Eastman Kodak Company, Rochester, New York. The "N-type" surface (smooth lustre) of this paper is preferred to the "E-type" surface (fine grained lustre). This paper is readily available in large amounts and in a form suitable for mass production. Tests have shown that the sensitivity characteristics of this standard photography paper are relatively uniform from batch to batch owing to close production control on the part of the manufacturer.

An additional important advantage of photographic paper over film is that the density (degree of darkening) of such paper is primarily a function of the extent of radiation exposure (intensity multiplied by time) and that it is less strongly affected by variations in processing, e. g., length of development and temperature of the developing solution, than photographic film of comparable sensitivity characteristics.

As shown in Figure 5, the test strip 25 of photographic paper is flanked on both sides by a comparison scale which is subdivided into six steps in the form of respective bands extending transversely to strip 25 and printed in different shades of gray, corresponding to an overall exposure range from zero to 600 roentgens. The gamma exposure ranges indicated on the individual steps of the comparison scale are shown in the following table:

| Scale step designation | Exposure Range in Roentgen Units |
|---|---|
| a | 0-50 |
| b | 50-100 |
| c | 100-200 |
| d | 200-300 |
| e | 300-400 |
| f | 400-600 |

These scale steps were chosen with special regard to the probable early biological effects of acute radiation doses over the whole body. It will be noted that the median lethal dose of 400 roentgens represents the upper limit of step "e" and the lower limit of step "f" of the comparison scale, thus affording an opportunity for a close estimate in this critical exposure range.

The gamma exposure ranges marked on the comparison scale shown in the above table may obviously be modified to fulfill specific requirements of the medical authorities, or to correspond more closely to the radiation response characteristics of the photographic material employed.

Secured longitudinally and centrally to the opposite side of the tab 24 is the pressure-sensitive element 26 which serves for identification of the user of the badge, as above explained. Said identification element preferably comprises an underlying strip of thin, smooth, dark-colored, waxed plastic sheet material 27, an overlying strip of clear, transparent cellophane tape 28, and an intermediate narrower strip of thin translucent paper 29 centered between strips 27 and 28 and secured therebetween by the adhesion of the side marginal portions of strip 28 and strip 27. The underside of strip 27 is coated with adhesive, whereby the strip 27 is secured to the surface of cardboard tab 24 in the position illustrated in Figure 4. Pressure on the top surface of strip 28 by a stylus, metal stamp, or the like, produces a dark impression as the thin paper strip 29 is pressed against the waxed strip 27, similar to the impression produced on the well known "magic slate." Information may therefore be recorded on the pressure-sensitive element 26 by the application of localized pressure through the sealed sheath 21 and the sealed foil envelope 22, as for example, the identifying numerals shown in Figure 4, which may be recorded simultaneously on the outer sheath 21 and on the pressure-sensitive element. As explained above, the element 26 will also function as a heat-damage indicator, since the subjection thereof to high temperature, of the order of 150 degrees Fahrenheit or above for any appreciable time will cause the wax coating of strip 27 to melt and spread, causing the element 26 to become darkened at its intermediate portion and to there assume the same color which is visible along the side margins of the identification element.

As an alternative, ordinary carbon paper may be employed adjacent the tab 24 for recording information on the tab, and a temperature-sensitive pigment may be employed as a heat-damage indicator on said tab. The pigment may be applied in the form of a streak made on the back of the tab by means of a "Tempil-Stik," which designates a temperature-sensitive marking crayon made by the Fisher Scientific Company, Pittsburgh, Pennsylvania. These crayons are designed so as to indicate narrow temperature ranges by color changes induced by melting of the pigment composition. For the present device, a crayon indicating temperature in excess of 125 degrees Fahrenheit would be preferably employed.

A commercially available pressure-sensitive indicating material which may be employed, for example, is "Labelon" tape, manufactured by Labelon Tape Company, Rochester, New York.

In the embodiment of the invention illustrated in Figures 6 and 7, the foil envelope, designated at 22', is provided with a non-metallic window 30 of suitable thin penetrable material, such as nylon sheet material, located so as to overly the photographic strip 25, whereby the indicator may detect alpha rays, as well as gamma and beta radiation, said material being opaque to visible light, although transparent to alpha rays.

In the embodiment of the invention illustrated in Figures 8 and 9, the outer sheath, designated at 21', is provided on opposite sides thereof with metal filters 31, 31, such as strips of sheet cadmium, sheet silver, or lead, arranged as shields covering the opposite sides of the photographic strip and protecting the photographic emulsion against hard beta and soft gamma rays. The function of the metal filters is not only the protection of the photographic emulsion against hard beta and soft gamma rays, but also to act as equalizing elements in order to insure that the photographic emulsion will register equal amounts of gamma radiation (expressed in terms of roentgen units) with the same density independently of the wave length over a wide range of the gamma energy spectrum (from approximately 0.1 to 10 m. e. v.).

As shown in Figure 9, the filters 31, 31 are covered on their inner sides by sections of sheet plastic material 31', 31' to absorb soft beta rays emitted by the metal filter strips by the impact of hard gamma rays thereon from outside the sheath. As shown in Figure 8, the sheath 21' is not hermetically sealed but is unsealed at its top margin to allow for the insertion or removal of the foil envelope by the wearer. Said sheath 21' is provided with a closure flap 32' having a conventional snap fastener 33' or a similar releasable fastener. Replacement of the film badge filler cartridge is thus made possible after it has been processed to determine radiation exposure or after the shelf life of the photographic emulsion has expired. The sheath 21' may be made of leather, plastic, plastic-impregnated cloth, or any other wear-resistant pliable material.

In order to detect accidental exposure of the inner strip of photographic material to light, e. g., through tearing of the foil envelope in the course of its use, a strip of photographic paper of suitable light-sensitivity may be included in the foil envelope. This strip is preferably affixed to the rear side of the tab 24 adjacent to the pressure-sensitive identification element, as shown at 32 in Figure 4. Strip 32 is of a type having low sensitivity to gamma rays but having a sufficiently high sensitivity to daylight or artificial light so as to turn dark upon processing if the indicator tab 23 has been exposed to visible light by accident or through tampering with the badge.

It will be understood that after a suspected exposure to ionizing radiation, the film badge will be turned over to the appropriate authority or agency for processing, the foil envelope being removed from the outer sheath and said sheath being retained by the individual concerned or by his medical representative for purposes of identification. The foil envelope is opened in a photographic dark-room and the indicator tab is processed to develop the photographic element 25. After a badge has been thus processed, the dosage range may readily be estimated by matching visually the tone or shade of the processed photographic element with the individual steps of the adjacent comparison scale. This should allow one to estimate the gamma exposure received by the badge, and hence by its wearer, to within a range of approximately 25 to 50 roentgen units, depending upon the location of the match point with regard to the scale. The limits of error of visual matching would be expected to become more closely defined the lower the exposure range and the closer the shade of the processed photographic emulsion approaches the shade of one of the actual scale steps, which represent median exposure within the stated intervals of the scale above set forth. It is obvious that the visual match will also depend upon the fit of tone values and reflectivity of the processed emulsion and the comparison scale. For optimum precalibration of the badge scale, said scale is preferably prepared photographically from the same materials as the photographic indicator strip.

The original scale may be prepared with the aid of a radium source. Strips of the photographic material employed in the radiation detector are exposed to various dosages of gamma rays from the radium source, from 50 to 600 roentgens, and are then processed simultaneously. A master scale is prepared from these test strips covering the exposure range anticipated in an atomic attack according to published information. This master scale is then carefully reproduced either by mechanical means, e. g., by half-tone or full-tone printing processes, or by photographic reproduction methods. The density of the scale reproductions is closely matched to the corresponding densities of the various steps of the master scale through photoelectric densitometry. In this manner, a correct precalibration of the radiation detector is insured. The enclosure of such precalibrated exposure scales eliminates the need for densitometry of the photographic paper of the detector following its exposure to penetrating radiation and thus materially simplifies the procedure of evaluating the film badge, as compared with the methods now in use.

Figures 10 to 13 illustrate a gauge device intended specifically for reading the processed indicator tabs. The gauge device is designated generally at 33 and comprises a rectangular plastic or plastic-coated cardboard body 34 formed on one side thereof with a generally rectangular recess 35 shaped to receive an indicator element snugly therein, as shown in Figures 10 and 11. Designated at 36 is a mask member which is slidably engaged on the rectangular member 34 for movement longitudinally thereon in transverse overlying relationship to the rectangular recess 35.

The front side of body 34 has the letters "a" to "f" adjacent one side margin of recess 35, said letters being registrable with the corresponding letters on an indicator element disposed in recess 35, as shown in Figure 10. Adjacent the other side margin of recess 35 the body 34 carries the exposure ranges corresponding to the respective letters "a" to "f," as set forth in the table previously described. The opposite side of body 34 is inscribed with said exposure ranges and with information as to the physiological effects associated therewith, as shown in Figure 12. The front side of the mask 36 is formed with respective apertures 37, 38 and 39, and the rear side of said mask is formed with additional apertures 40 and 41. As shown in Figures 10 and 12, when the mask is positioned in overlying relation to an indicator element 23, corresponding adjacent letters will be visible through the apertures 37 and 38 at the front side of body 34, and aperture 39 will show the exposure range associated therewith. The apertures 41 and 40 at the rear side of body 34 will respectively show the same range of exposure and the physiological effects associated therewith.

In using the gauge device 33, the indicator element 23 is placed in recess 35, either in its dry state or in its wet state immediately subsequent to developing and fixing the photographic strip 25 thereof. The mask 36 is then moved over the indicator element until the closest visual match is obtained between the photographic strip 25 and the darkened scale areas at opposite sides thereof, as observed through the aperture 38 of the mask. The range of exposure may then be read through the aperture 39 and the possible physiological effects to be expected therefrom may be instantly determined by referring to aperture 40 at the rear side of the gauge device.

While certain specific embodiments of improved radiation detecting and indicating devices have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a radiation detector, an indicator element comprising a tab, photographic material on one side of said tab adapted to be affected by exposure to ionizing radiation, a pressure-sensitive identification element on the other side of said tab, said identification element being of a type providing visible localized marks having high contrast thereon responsive to external localized pressure on its surface, an envelope of flexible metal foil surrounding said indicator element, said envelope being pervious to ionizing radiation and being deformable to allow marking pressure to be transmitted therethrough to said pressure-sensitive element and to retain the marking deformation, and a non-metallic, light-opaque window in said envelope adjacent said photographic material.

2. In a radiation detector, an indicator element comprising a tab, photographic material on said tab adapted to be affected by exposure to ionizing radiation, and a pressure and temperature-sensitive identification element secured on said tab, said element being of a type providing visible marks thereon having high contrast responsive to marking pressure, and becoming darkened when exposed to high temperature, said identification element comprising a waxed, underlying, dark-colored strip, a transparent, flexible, overlying strip secured on said dark-colored strip, and a flexible translucent strip interposed between said waxed underlying strip and said transparent overlying strip, whereby identification marks may be made by applying localized marking pressure on said transparent overlying strip, and whereby an indication of heat damage to the indicator element will be provided by the darkening of substantial areas thereof.

3. In a radiation detector, an indicator element comprising a tab, photographic material on said tab adapted to be affected by exposure to ionizing radiation, a pressure-sensitive identification element secured on said tab, said element being of a type providing visible marks thereon having high contrast responsive to marking pressure, said identification element comprising a waxed, underlying, dark-colored strip, a transparent, flexible, overlying strip secured on said dark-colored strip, and a flexible, translucent strip interposed between said waxed underlying strip and said transparent overlying strip, and a light-opaque envelope of flexible material surrounding said indicator element, said envelope being pervious to ionizing radiation and being deformable to allow localized marking pressure to be transmitted therethrough to the surface of said pressure-sensitive element and to retain the marking deformations.

4. In a radiation detector, an indicator element comprising a tab, photographic material on said tab having high sensitivity to ionizing radiation, a pressure and heat-sensitive identification element on said tab, said pressure and heat-sensitive element being of a type providing visible localized marks thereon having high contrast responsive to localized physical pressure on its surface and becoming darkened when exposed to high temperature, and a light-opaque envelope of deformable, malleable material surrounding said indicator element, said envelope being pervious to ionizing radiation and being sufficiently deformable to allow localized marking pressure to be transmitted therethrough to said pressure and heat-sensitive element and retaining the same marking, whereby the envelope may be identified with the indicator element after said indicator element has been removed from the envelope and whereby heat damage to the indicator element may be detected by the darkening thereof.

5. In a radiation detector, an indicator element comprising a tab, photographic material on said tab having high sensitivity to ionizing radiation, a pressure and heat-sensitive identification element on said tab, said pressure and heat-sensitive element being of a type providing visible localized marks thereon having high contrast responsive to localized physical pressure on its surface and becoming darkened when exposed to high temperature, and a light-opaque envelope of thin, deformable metal foil surrounding said indicator element, said envelope being pervious to ionizing radiation and being sufficiently deformable to allow localized marking pressure to be transmitted therethrough to said pressure and heat-sensitive element and retaining the same marking, whereby the envelope may be identified with the indicator element after said indicator element has been removed from the envelope and whereby heat damage to the indicator element may be detected by the darkening thereof.

6. In a radiation detector, an indicator element comprising a tab, photographic material on said tab having high sensitivity to ionizing radiation, a pressure and heat-sensitive identification element on said tab, said pressure and heat-sensitive element being of a type providing visible localized marks thereon having high contrast responsive to localized physical pressure on its surface and becoming darkened when exposed to high temperature, a light-opaque envelope of thin, deformable metal foil surrounding said indicator element, said envelope being pervious to ionizing radiation and being sufficiently deformable to allow localized marking pressure to be transmitted therethrough to said pressure and heat-sensitive element and retaining the same marking, whereby the envelope may be identified with the indicator element after said indicator element has been removed from the envelope and whereby heat damage to the indicator element may be detected by the darkening thereof, and a strip of light-sensitive photographic material having low sensitivity to gamma rays secured on said tab adjacent the first-named photographic material to detect exposure of the tab to visible light.

7. In a radiation detector, an indicator element comprising a tab, photographic material on said tab having a high sensitivity to ionizing radiation, a pressure-senstive identification element on said tab, said pressure-sensitive element being of a type providing visible localized marks thereon having high contrast responsive to localized physical pressure on its surface, a sealed, frangible first light-opaque envelope of deformable malleable material surrounding said indicator element, said envelope being pervious to ionizing radiation and being deformable to allow localized marking pressure to be transmitted therethrough to said pressure-sensitive element and retaining the same marking, whereby said first envelope may be identified with the indicator element after said indicator element has been removed from the envelope, and a second envelope of deformable malleable material pervious to ionizing radiation surrounding said first envelope and being deformable to transmit said marking pressure to said first envelope and to retain the marking deformations.

References Cited in the file of this patent

UNITED STATES PATENTS

| Number | Name | Date |
|---|---|---|
| 456,396 | Blakemore | July 21, 1891 |
| 1,512,827 | Deutsch | Oct. 21, 1924 |
| 1,556,499 | Deutsch | Oct. 6, 1925 |
| 1,922,823 | Sawford | Aug. 15, 1933 |
| 2,253,231 | Friedell | Aug. 19, 1941 |
| 2,258,593 | Black | Oct. 14, 1941 |
| 2,322,044 | McFarlane et al. | June 15, 1943 |
| 2,380,244 | Jones et al. | July 10, 1945 |
| 2,483,991 | Wollan et al. | Oct. 4, 1949 |
| 2,496,218 | Kieffer | Jan. 31, 1950 |
| 2,505,346 | Williams | Apr. 25, 1950 |
| 2,520,077 | Wolowitz | Aug. 22, 1950 |

OTHER REFERENCES

Photographic Neutron Dosimetry to Date, Dessauer et al. AECD 2278, July 14, 1944, pgs. 1–4.

Photographic Film as a Pocket Radiation Dosimeter, Pardue et al., April 8, 1944, pgs. 1–7, MDDC 1065.